No. 778,708. PATENTED DEC. 27, 1904.
J. M. RHODES.
PISTON ROD PACKING.
APPLICATION FILED JULY 28, 1904.
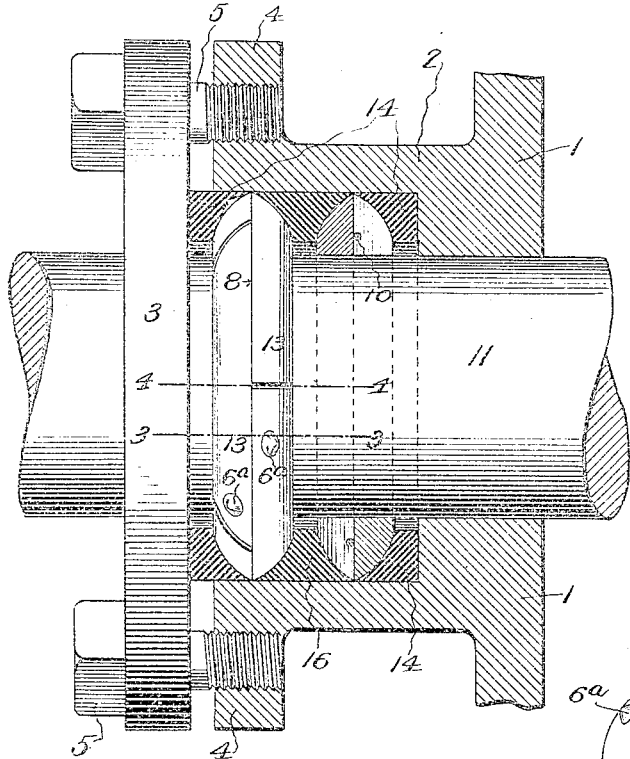
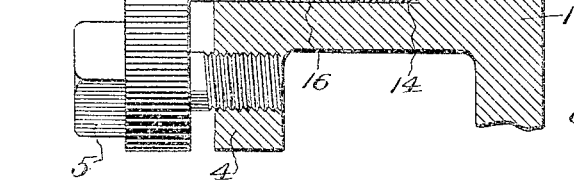
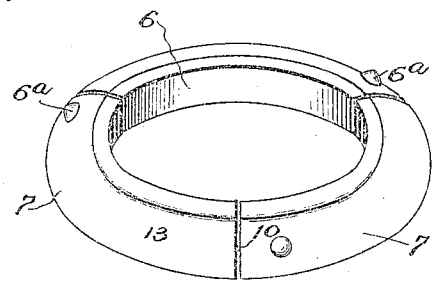
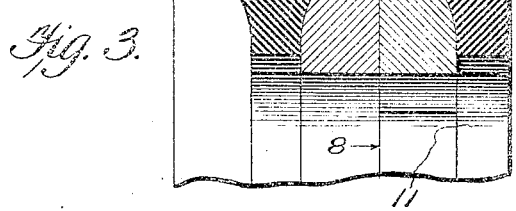
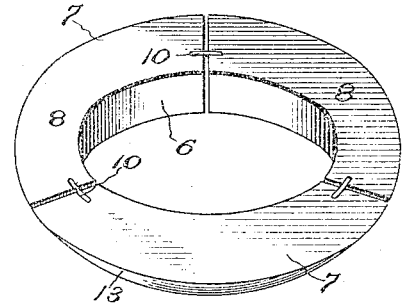
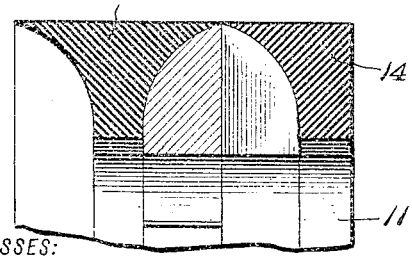
WITNESSES:
O. W. Holmes.
John T. Schrott.
INVENTOR
John M. Rhodes.
BY
Fred G. Dieterich
ATTORNEYS No. 778,708.                                    Patented December 27, 1904.

UNITED STATES PATENT OFFICE.

JOHN MASON RHODES, OF PHILADELPHIA, PENNSYLVANIA.

PISTON-ROD PACKING.

SPECIFICATION forming part of Letters Patent No. 778,708, dated December 27, 1904.

Application filed July 28, 1904. Serial No. 218,529.

*To all whom it may concern:*

Be it known that I, JOHN MASON RHODES, residing at Philadelphia, in the county of Philadelphia and State of Pennsylvania, have invented certain new and useful Improvements in Piston-Rod Packing, of which the following is a specification.

This invention relates to improvements in that type of piston-rod packing formed of sectional metal rings and rubber, and it more especially seeks to provide certain improvements on the form of piston-rod packing shown in patent to W. S. Rhodes, No. 419,069, patented January 7, 1890.

In its more subordinate features my invention consists in certain novel details of construction and peculiar combination of parts, all of which will be first fully described in detail, specifically pointed out in the appended claims, and illustrated in the accompanying drawings, in which—

Figure 1 is a longitudinal section of a stuffing-box and gland of the conventional type. Figs. 2 and 2ª show in perspective two of the sectional metal rings separated. Fig. 3 is an enlarged detail cross-sectional view of a pair of the metal rings and the rubber packing-rings that coöperate therewith, the sections being taken substantially on the line 3 3 of Fig. 1. Fig. 4 is a similar view taken on the line 4 4 of Fig. 1.

Referring now to the drawings by figures of reference, 1 designates the cylinder-head, 2 the stuffing-box, which is cast integral therewith, and 3 the gland, all of which may be of any approved or suitable construction.

4 and 5 designate the usual flange and studbolts, that coöperate with the glands for holding the packing-rings in their operative position within the stuffing-box.

My improved packing consists of a number of metal rings 6, formed of a plurality of sections 7, three being shown in the drawings. The rings 6 are formed with flat sides 8 and are used in pairs with the flat sides opposite each other, as shown in Figs. 1, 3, and 4. The said flat sides form with each other a practically steam-tight joint. The two rings of each pair of packing members 6 are so disposed that their joints or openings between two sections of one ring are opposite to the middle of the sections in the other ring, whereby to permit the joints and the ends of the several sections to be connected by soft flexible wires 10, that are cast or otherwise molded with the sections 7, as clearly shown in the drawings, the said connecting-wires serving to hold the sections in place while inserting the rings into the stuffing-box and to permit of the required contraction of the rings upon the piston-rod 11. Each of the rings has its inner edge concaved, so as to accurately fit the piston-rod 11, and that side 13 of the rings opposite the flat side is convexly curved or otherwise formed to snugly seat within the concavity or curvature of the outer narrow rubber packing-rings 14 and the concavity or seats in the central or wide packing 16, as clearly shown in Fig. 1, by reference to which it will be noticed that the narrow rings 14 are disposed at the ends of the stuffing-box, whereas the wide ring is arranged intermediate each complete pair of metal packing-rings, and while I have shown but two of the complete packing-rings in the drawings as used within the stuffing-box it is obvious that a greater number of the said rings may be used; but in that event additional wide rings 16 are also used, as the narrow rings 14 are only employed at the extreme ends of the stuffing-box. In my invention I provide a positive means for holding the said rods from turning with or crowding the piston-rod 11 or moving independently of each other. In other words, I provide a means for holding each pair of rings that constitute a complete metal packing-ring 6 in such position that they will not rotate or crawl independently of each other. For such I provide the beveled or convexed face of the ring 6 with outwardly-projecting nibs or projections 6ª, which in practice become indented in the rubber rings in which the metal rings themselves seat, and by reason of such indentation the metal rings 6 become firmly interlocked with the rubber rings that bear endwise against them.

From the foregoing description, taken in connection with the accompanying drawings, it is thought the complete construction, operation, and advantages of my invention will be readily apparent. Since the metal rings are the only parts of the packing which come in contact with the piston-rod, consequently the packing has great durability. Where the rod is worn out, the true circular shape or elasticity of the rubber rings permits the metal packing-rings to accommodate themselves to the inequality of the transverse movement, and the leak of steam and springing of the rod is avoided. The pressure of the steam against the inner end of the packing when live steam is on the packing-ring serves to force the packing-rings 6 against the piston-rods and also the rings against the sides of the stuffing-box, thus preventing the escape of the steam.

By providing a wide soft-metal ring between each pair of complete metal packing members 6 and narrow soft-rubber rings at the ends of the said metal packing members 6 the several complete packing members are sufficiently separated to form the necessary steam-tight joint, and by reason of the nibs c on the packing members the said packing members are held from crawling and losing their desired relation with respect to each other.

Having thus described my invention, what I claim, and desire to secure by Letters Patent, is—

1. In a stuffing-box of the character described, a packing member consisting of a plurality of metal rings each formed of sections, flexible metal connections between said sections, each of said sections being formed with a protuberance projected from the outer faces thereof, in combination with flexible packing members for engaging with the outer faces of said metal rings, said protuberances projecting into and engaging with said packing members substantially as shown and for the purposes described.

2. In a piston-packing of the character described the combination with the rod, the stuffing-boxes and the gland, of a packing member composed of two metal rings, each ring being formed of sections, said sections having flexible metal connections and having flat sides whereby to bear on said rings and adapted to lie closely with their flat sides against each other, the outer surface of the said metal-ring sections being inclined to form projections, and double soft-rubber bearing-rings interposed between each pair of complete packing members and a soft-rubber packing-ring disposed between the end walls of the said stuffing-box and the metal packing-rings, and means for clamping up the stuffing-box gland all being arranged substantially as shown and described.

JOHN MASON RHODES.

Witnesses:
L. R. RHODES,
JOSEPH LANTERN.